United States Patent
Kyogoku et al.

(10) Patent No.: US 6,625,360 B2
(45) Date of Patent: Sep. 23, 2003

(54) SINGLE-MODE OPTICAL FIBERS AND FABRICATION METHODS THEREOF

(75) Inventors: Takeshi Kyogoku, Yokohama (JP); Masumi Ito, Yokohama (JP); Takehiko Kito, Yokohama (JP); Sumio Hoshino, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 138 days.

(21) Appl. No.: 09/845,301

(22) Filed: May 1, 2001

(65) Prior Publication Data

US 2002/0021877 A1 Feb. 21, 2002

Related U.S. Application Data

(63) Continuation-in-part of application No. PCT/JP99/06040, filed on Oct. 29, 1999.

(30) Foreign Application Priority Data

Nov. 2, 1998 (JP) .............................................. 10/312240

(51) Int. Cl.⁷ ............................. G02B 6/02; G02B 6/16
(52) U.S. Cl. .................................... 385/123; 385/127
(58) Field of Search .................................. 385/126, 127, 385/123

(56) References Cited

U.S. PATENT DOCUMENTS

| 4,339,174 A | 7/1982 | Levin .......................... 385/142 |
| 4,755,022 A | 7/1988 | Ohashi et al. ............... 385/127 |
| 4,852,968 A | 8/1989 | Reed ........................... 385/127 |
| 4,944,783 A | 7/1990 | Hongo et al. ................. 65/3.11 |
| 5,278,931 A | 1/1994 | Antos et al. ................. 385/126 |
| 5,683,486 A | * 11/1997 | Oyamada et al. ........... 385/127 |

FOREIGN PATENT DOCUMENTS

| DE | 4033768 C1 | 7/1991 |
| DE | 4127868 A1 | 2/1993 |
| EP | 0602467 A1 | 6/1994 |
| EP | 0634372 A1 | 1/1995 |
| EP | 0 856 754 | 8/1998 |
| JP | 56-27843 | 6/1981 |
| JP | 60-48456 | 10/1985 |
| JP | 5-58663 | 3/1993 |
| JP | 7-88231 | 9/1995 |
| JP | 08133777 | 5/1996 |
| JP | 8-133777 | 5/1996 |
| JP | 9-263418 | 10/1997 |
| WO | 96/30788 | 10/1996 |

* cited by examiner

Primary Examiner—Mark A. Robinson
Assistant Examiner—Alessandro Amari
(74) Attorney, Agent, or Firm—McDermott, Will & Emery

(57) ABSTRACT

For an index change of an interfacial region 20 which is formed in a boundary between core region 10 and cladding region 30 and which decreases its refractive indices from the core region 10 side to the cladding region 30 side, a change rate in relative index difference $(0.5 \times \Delta n)/(d/r)$ normalized by a core radius r, obtained for a domain of change from $0.8 \times \Delta n$ to $0.3 \times \Delta n$ relative to a relative index difference $\Delta n$ of the core region 10, is used as an index for evaluation of refractive index change and an allowable range of values thereof is set to a range of the lower limit of 0.4% to the upper limit of 4.0%, whereby a single-mode optical fiber capable of low loss phototransmission can be realized while reducing influence of a tail spread and strain in the optical fiber.

12 Claims, 3 Drawing Sheets

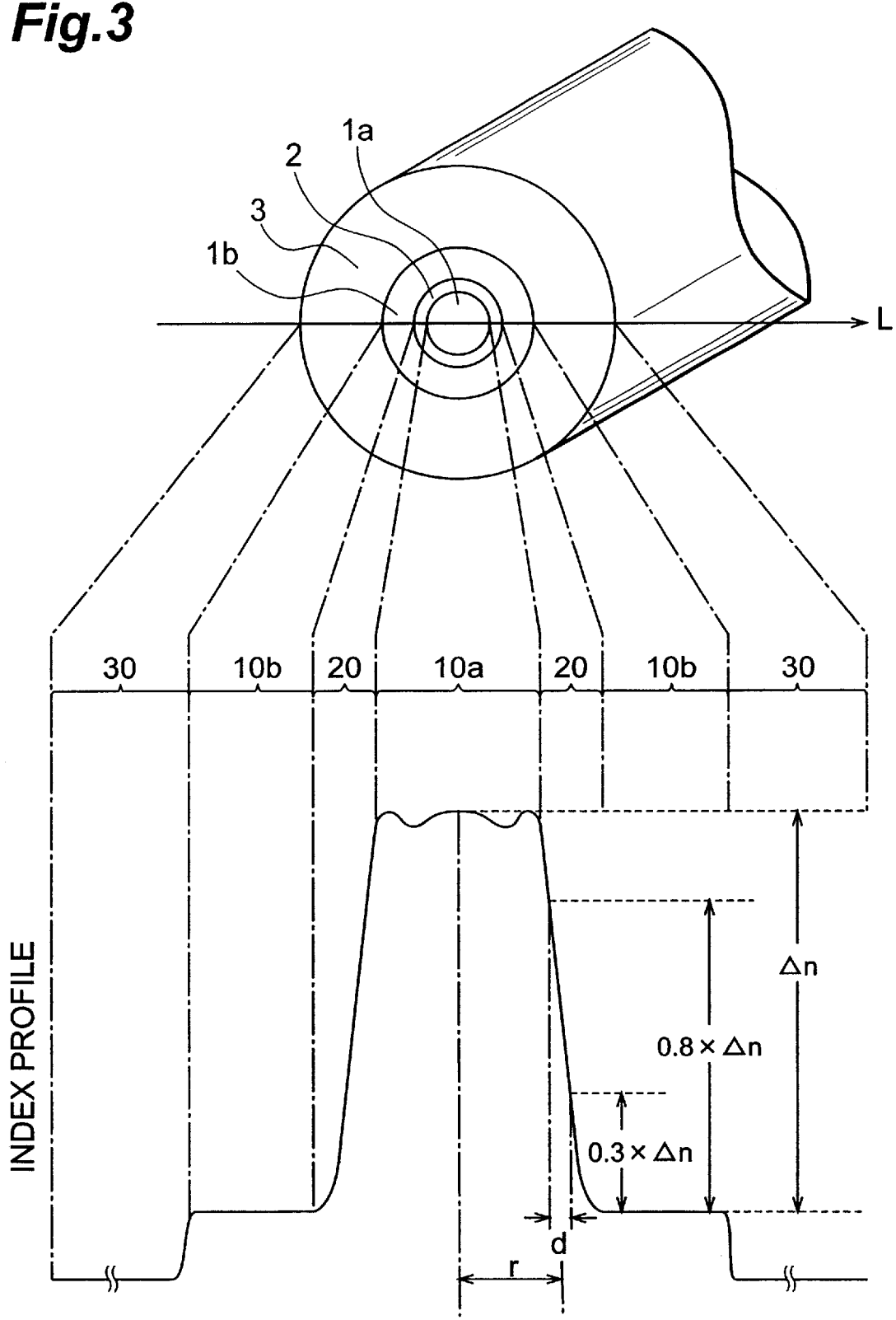

SINGLE-MODE OPTICAL FIBERS AND FABRICATION METHODS THEREOF

RELATED APPLICATION

This is a continuation-in-part application of application Ser. No. PCT/JP99/06040 filed on Oct. 29, 1999, now pending, which in turn claims the benefit of Japanese Patent Application No. 10/312240, filed Nov. 2, 1998, the disclosures of which Applications are incorporated by reference herein. The benefit of the filing and priority dates of the International and Japanese Applications is respectfully requested.

BACKGROUND OF THE INVENTION

1. Field of the Invention

The present invention relates to single-mode optical fibers used in optical transmission systems, and fabrication methods thereof.

2. Related Background Art

An optical fiber of a single mode type or the like is composed of a core region as a region in which light is transmitted, and a cladding region provided around the periphery thereof, and the optical fiber is constructed in such setting that the refractive index of the core region is slightly larger than that of the cladding region, thereby achieving optical transmission in the core region. Particularly, in the single-mode optical fibers the light is transmitted while optical power also spreads into the cladding region near the core region.

In the interfacial region being a boundary area between the core region and the cladding region, its refractive indices do not vary discontinuously but vary in a certain continuous index profile in which the refractive indices decrease from the core region toward the cladding region, in fact. Concerning such index change in the boundary, for example, Japanese Patent Application Laid-Open No. S49-17246 describes a layer with continuous index change provided in the boundary.

On the other hand, for example, Japanese Patent Applications Laid-Open No. S57-27934 and No. H03-8737 describe methods of fabricating a glass preform for optical fiber so as to reduce the thickness of the interfacial region (tail or tail spread).

SUMMARY OF THE INVENTION

With the interfacial region of the continuously changing index profile as described above, when the index change rate is small and when the thickness of the interfacial region is large, there arises a problem that the optical power transmitted, particularly, in the single-mode optical fibers is affected by the tail spread of index and the zero dispersion wavelength becomes longer than the working wavelength region. On the other hand, when the index change rate is large and when the thickness of the interfacial region is small, strain and heterogeneous portions remain inside the optical fiber after drawing because of a difference between viscosities of materials of the core region and cladding region, which will result in increasing transmission loss.

Namely, in the interfacial region there is a tradeoff relation between the limitation from the influence of the tail spread in a practical aspect and the limitation from occurrence of strain inside the optical fiber in a fabrication aspect, and it was difficult to overcome the both.

The present invention has been accomplished in view of the above problems and an object of the invention is to provide single-mode optical fibers having the interfacial region with adequate index change and achieving low loss phototransmission, and fabrication methods thereof.

For accomplishing the above object, a single-mode optical fiber according to the present invention is a single-mode optical fiber comprising a core region having a refractive index of $n_1$ and a cladding region disposed around the periphery of the core region and having a refractive index of $n_2$ to satisfy $n_2 < n_1$, wherein a relative index difference in each part is determined with respect to the refractive index $n_2$ of the cladding region, and a relative index difference of the core region is defined as $\Delta n$, wherein in an interfacial region with a continuously changing index profile near a boundary between the core region and the cladding region, for a domain in which a relative index difference varies from $0.8 \times \Delta n$ to $0.3 \times \Delta n$, a change rate in relative index difference $(0.5 \times \Delta n)/(d/r)$ normalized by a core radius r, where d is a thickness of the domain in a direction along a fiber diameter, and $0.5 \times \Delta n$ is a relative index difference change, is not less than 0.4% nor more than 4.0%.

A fabrication method of a single-mode optical fiber is a method of fabricating a single-mode optical fiber comprising a core region having a refractive index of $n_1$ and a cladding region disposed around the periphery of the core region and having a refractive index of $n_2$ to satisfy $n_2 < n_1$, the method comprising: a forming step of forming the core region by a VAD method or an OVD method; and a selection step of selecting a transparent glass preform of the single-mode optical fiber including the core region, wherein in the selection step, a relative index difference in each part is determined with respect to the refractive index $n_2$ of the cladding region, and a relative index difference of the core region is defined as $\Delta n$, and the transparent glass preform is selected so that in an interfacial region with a continuously changing index profile near a boundary between the core region and the cladding region, for a domain in which a relative index difference varies from $0.8 \times \Delta n$ to $0.3 \times \Delta n$, a change rate in relative index difference $(0.5 \times \Delta n)/(d/r)$ normalized by a core radius r, where d is a thickness of the domain in a direction along a fiber diameter, and $0.5 \times \Delta n$ is a relative index difference change, is not less than 0.4% nor more than 4.0%.

For determining a favorable condition for index change in the interfacial region in which the refractive indices decrease from the core region of the relative index difference $\Delta n$ to the cladding region of the relative index difference of 0, a criterion for evaluation thereof is determined as the change rate in relative index difference defined for the region in which the relative index difference varies from $0.8 \times \Delta n$ to $0.3 \times \Delta n$, and for values thereof the lower limit of the allowable range is set to 0.4% and the upper limit to 4.0%, thereby reducing the influence of the tail spread and the occurrence of strain in the optical fiber and thus realizing the single-mode optical fiber having favorable characteristics and capability of phototransmission with low transmission loss and the fabrication method thereof.

Namely, in order to realize the single-mode optical fiber capable of phototransmission with low loss, it is important to establish adequate evaluation and selection methods as to the index profile and thickness and as to the rate of index change based thereon for the interfacial region being the index changing region and to determine a favorable condition from the practical aspect and fabrication aspect. However, the aforementioned documents concerning the boundary and the tail spread fail to clearly describe the condition and others and include neither specific description nor investigation thereof.

In the present invention, the above region (80% to 30% of Δn) used as an evaluation criterion was set as a change range most suitable for the evaluation of change rate based on the evaluation that the inventors carried out using actual measurement results, as described hereinafter. When the transparent glass preform is selected based on the favorable condition of the index change determined as described above using the evaluation method, it becomes feasible to obtain the low loss single-mode optical fiber with certainty.

Since the relative index difference is normally expressed in percent (for example, about 0.3% in the case of the single-mode optical fibers), the change rate in relative index difference is also expressed similarly in percent. For the core radius r and the thickness d, measurement is carried out for the transparent glass preform for the optical fiber and they are expressed by the result of the measurement in units of mm or expressed as reduced values in units of μm to the optical fiber after drawing.

The single-mode optical fibers with such index change are not limited to those consisting of a single core region and a cladding region. Namely, another single-mode optical fiber according to the present invention may be a single-mode optical fiber comprising an inner core region having a refractive index of $n_1$, an outer core region disposed around the periphery of the inner core region and having a refractive index of $n_2$ to satisfy $n_2 < n_1$, and a cladding region disposed around the periphery of the outer core region, wherein a relative index difference in each part is determined with respect to the refractive index $n_2$ of the outer core region, and a relative index difference of the inner core region is defined as Δn, wherein in an interfacial region with a continuously changing index profile near a boundary between the inner core region and the outer core region, for a domain in which a relative index difference varies from 0.8×Δn to 0.3×Δn, a change rate in relative index difference (0.5×Δn)/(d/r) normalized by an inner core radius r, where d is a thickness of the domain in a direction along a fiber diameter, and 0.5×Δn is a relative index difference change, is not less than 0.4% nor more than 4.0%.

Another fabrication method of a single-mode optical fiber may be a method of fabricating a single-mode optical fiber comprising an inner core region having a refractive index of $n_1$, an outer core region disposed around the periphery of the inner core region and having a refractive index of $n_2$ to satisfy $n_2 < n_1$, and a cladding region disposed around the periphery of the outer core region, the method comprising: a forming step of forming the inner core region by a VAD method or an OVD method; and a selection step of selecting a transparent glass preform of the single-mode optical fiber including the inner core region, wherein in the selection step, a relative index difference in each part is determined with respect to the refractive index $n_2$ of the outer core region, and a relative index difference of the inner core region is defined as Δn, and the transparent glass preform is selected so that in an interfacial region with a continuously changing index profile near a boundary between the inner core region and the outer core region, for a domain in which a relative index difference varies from 0.8×Δn to 0.3×Δn, a change rate in relative index difference (0.5×Δn)/(d/r) normalized by an inner core radius r, where d is a thickness of the domain in a direction along a fiber diameter, and 0.5×Δn is a relative index difference change, is not less than 0.4% nor more than 4.0%.

The single-mode optical fiber and the fabrication method thereof described above also provide the low loss single-mode optical fiber similarly.

BRIEF DESCRIPTION OF THE DRAWINGS

FIG. 3 is a schematic diagram to show a cross-sectional structure and an index profile of another embodiment of the single-mode optical fiber.

DESCRIPTION OF THE PREFERRED EMBODIMENTS

Figure 1:
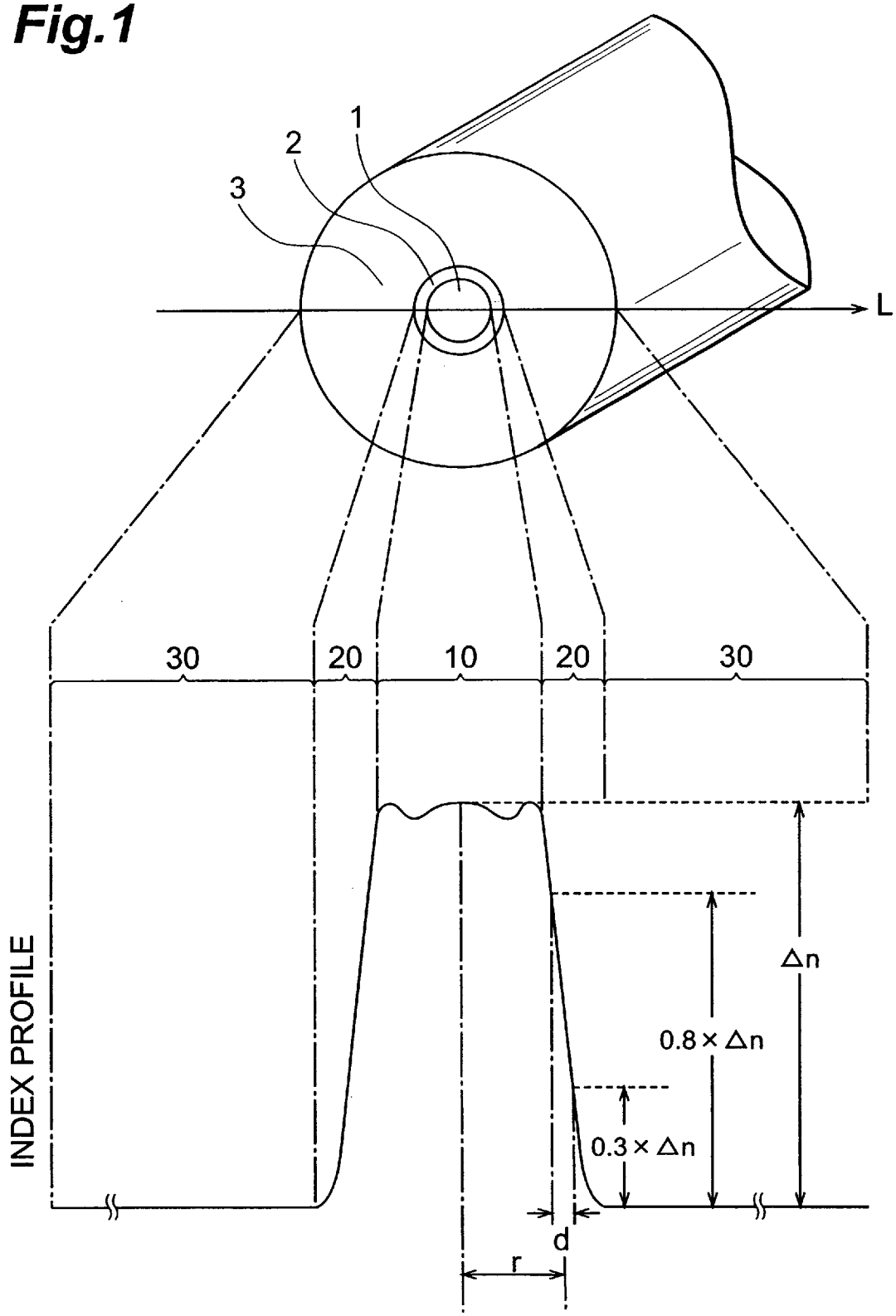
FIG. 1 is a schematic diagram to show a cross-sectional structure and an index profile of an embodiment of the single-mode optical fiber.

The preferred embodiments of the single-mode optical fibers and fabrication methods thereof according to the present invention will be described hereinafter in detail with reference to the drawings. It is noted that the dimensions in the drawings do not always agree with those in the description.

FIG. 1 is a diagram schematically showing a cross-sectional structure of an embodiment of a single-mode optical fiber according to the present invention and a refractive index profile thereof in the direction along the fiber diameter (or in the direction indicated by a line L in the figure). The horizontal axis of the index profile illustrated in FIG. 1 corresponds to positions on the cross section perpendicular to the center axis of core portion 1 along the line L indicated in the cross-sectional structure in the figure though it is drawn in different scale. In the index profile in the figure, therefore, a core region 10 corresponds to a region of a core portion 1 on the line L, an interfacial region 20 to a region of an interfacial portion 2 on the line L, and a cladding region 30 to a region of a cladding portion 3 on the line L, respectively. The vertical axis of the index profile represents relative index differences with respect to the refractive index of the cladding region 30.

The interfacial region 20 existing in the boundary between the core region 10 and the cladding region 30 is not a region provided separately from the core region 10 and the cladding region 30 in fact, but is a region formed as a tail spread in the boundary between them during fabrication of the optical fiber. Accordingly, there is no definite division between the regions, and the domains and divisional positions of the interfacial portion 2 and interfacial region 20 as illustrated in the figure are set and defined for clearly showing the existence of such region while discriminating the index-changing region from the others. The quantitative evaluation and others of that region is implemented for a specific change range of relative index difference being a part in this interfacial region 20 as described hereinafter.

Various characteristics as an optical transmission line of the single-mode optical fiber illustrated in FIG. 1 are determined and controlled by the refractive indices, outside diameters, etc. of the respective regions illustrated in the index profile. In the figure Δn indicates the relative index difference of the core region 10 with respect to the refractive index of the cladding region 30, which is defined by Δn= $(n_1 - n_2)/n_2$. In this definition, $n_1$ is the refractive index of the core region 10 and $n_2$ the refractive index of the cladding region 30. If refractive indices are distributed in the core region 10, a maximum refractive index is used as $n_1$.

The refractive indices of the interfacial region 20 formed in the boundary between these two regions continuously change and decrease from the index $n_1$ to $n_2$ from the core region 10 side to the cladding region 30 side. In order to quantitatively evaluate the characteristics of this index-changing region and select an optical fiber in a fabrication step, as described previously, it is necessary to determine an accurate and specific evaluation method, e.g., a change range of relative index difference as a reference. The inventors conducted investigation, based on actual measurement results with various optical fibers, and set from the investigation the change range of relative index difference to be used for the evaluation, to the domain of change from 0.8×Δn to 0.3×Δn (the range of 80% to 30% if the relative index difference of the core region 10 is 100%).

This evaluation of index change in the interfacial region 20 and selection of optical fiber based thereon is carried out for transparent glass base materials (preforms) of optical fibers, using an index profile measuring instrument (preform analyzer). However, since reduction rates from a preform into an optical fiber by drawing are sometimes different among preforms, it is also contemplated that an index change of an optical fiber after drawing is calculated with correction by the equivalent step index method (ESI method) if necessary.

For the index profile obtained in this way, an upper limit and a lower limit of an index change range used in the evaluation are determined with respect to the relative index difference Δn of the core region 10 and a change rate determined for that change range is used as an index for the evaluation of refractive index change. On this occasion, it is necessary to set the change range so as to best match the characteristics of various optical fibers used in practice and permit accurate evaluation of change rate. From the investigation based on the measurement results, the inventors selected and set the aforementioned change range of 80% to 30% as a favorable range for the evaluation and selection.

The evaluation of change rate is conducted using the core radius r illustrated in FIG. 1, and the thickness d in the direction along the fiber diameter of the domain corresponding to the change range described above. Here the core radius r is defined by a radius at a position where the relative index difference is 1/e of Δn. That position is a position where the relative index difference of the interfacial region 20 is about 0.37×Δn, and, therefore, the core radius r is different from the outside radius of the core region 10. The change rate is evaluated by a change rate in relative index difference obtained when the core radius r is 1, i.e., when it is normalized by the core radius, and that value is defined as (0.5×Δn)/(d/r).

In the above method, the change rate in relative index difference was determined from the thickness d between the position of the relative index difference of 0.8×Δn and the position of the relative index difference of 0.3×Δn and from the change of relative index difference of 0.5×Δn between the two positions, but it may be determined using other calculation methods. For example, it can be contemplated that a plurality of index measurement points in the range from 0.8×Δn to 0.3×Δn are fitted to a straight line by an approximation method, e.g. the least square fitting or the like, and the equivalent thickness d and rate of relative index difference change are calculated from the slope of the straight line. It is, however, desirable to use the same calculation method of change rate for comparison among change rates in relative index difference obtained for respective optical fibers.

Since the above measurement of index profile involves the normalization by the core radius, the evaluation can be implemented if the core part is vitrified. It is common practice to use a process of first making the core part and the cladding part and thereafter adding an adequate jacket layer thereto to fabricate an optical fiber preform. The measurement of index profile of the preform may be done for the transparent glass preform either before or after the addition of the jacket layer. For transparent glass preforms excluding the addition of the jacket layer, the index profile measurement can also be carried out in similar fashion.

A transparent glass preform of single-mode optical fiber having the outside diameter of 70 mm, fabricated by the VAD method, was evaluated by the above evaluation method to obtain the change rate in relative index difference of the single-mode optical fiber and comparison was made in various characteristics of the single-mode optical fiber with the change rate in relative index difference of not less than 0.4% nor more than 4.0% according to the present invention. The optical fiber of an embodiment thus evaluated demonstrated the values of Δn=0.346%, r=4.44 mm, and d=0.239 mm, and the change rate in relative index difference in this case is 3.21%. However, r and d herein are the numerical values of the preform before drawing and they correspond to the core radius r=7.93 μm and d=0.427 μm of the fiber after drawing to the fiber diameter of 125 μm. The characteristics of the optical fiber obtained by drawing this preform were the cutoff wavelength of 1262 nm, the mode field diameter of 9.28 μm, and the zero dispersion wavelength of 1316 nm, which were good characteristics for 1.3 μm-band phototransmission. The transmission losses at 1310 nm and at 1550 nm were 0.331 dB/km and 0.192 dB/km, respectively, and it was thus verified that there appeared no degradation of transmission losses and the low transmission losses were achieved in the above allowable range of the change rate in relative index difference.

For comparison therewith, the characteristics were determined for a single-mode optical fiber having the change rate in relative index difference of not more than 0.4%, i.e., the change rate of 0.37% outside the above allowable range. When the change rate is small as in this case, the influence of the tail spread becomes stronger on the phototransmission. The characteristics obtained were the cutoff wavelength of 1265 nm, the mode field diameter of 9.30 μm, and the zero dispersion wavelength of 1324 nm. This is a large shift to the long wavelength side and is not preferable for 1.3 μm-band phototransmission. Further, the transmission losses were obtained for a single-mode optical fiber having the change rate in relative index difference of not less than 4.0%, i.e., the change rate of 5.15% outside the above allowable range as well. When the change rate is large as in this case, there occurs strain inside the optical fiber. The transmission losses obtained were 0.338 dB/km and 0.205 dB/km at 1310 nm and at 1550 nm, respectively, and it was thus verified that the transmission losses increased due to the quick index change in the interfacial region.

It is seen from the above results that the range of change rate in relative index difference of not less than 0.4% nor more than 4.0% is desirable for realizing the single-mode optical fibers with low loss and with favorable characteristics.

Further, a transparent glass preform (before the addition of the jacket layer) of single-mode optical fiber having the outside diameter of 37 mm, fabricated by the VAD method, was evaluated by the above evaluation method to obtain the change rate in relative index difference of the single-mode optical fiber and comparison was made in various characteristics. The optical fiber of this embodiment thus evaluated demonstrated the values of Δn=0.362%, r=4.22 mm, and d=0.698 mm (the relative index difference change is 0.5× Δn=0.181%), and the change rate in relative index difference in this case is 1.094%. The characteristics of the optical fiber obtained by drawing this preform were the cutoff wavelength of 1279 nm, the mode field diameter of 9.16 μm, and the zero dispersion wavelength of 1314 nm, which were good characteristics for 1.3 μm-band phototransmission. The transmission losses were also good.

Similarly, the characteristics were determined for a single-mode optical fiber having the change rate in relative index difference of 0.85%. The characteristics obtained were the cutoff wavelength of 1285 nm, the mode field diameter of 9.21 μm, and the zero dispersion wavelength of 1319 nm. These characteristics are rather unfavorable compared to the above-mentioned characteristics with the change rate in relative index difference of 1.092%, however, these characteristics are good enough compared to those with the change rate of less than 0.4%.

It is seen from the above results that the range of change rate in relative index difference of not less than 1.0% nor more than 4.0% is more desirable for realizing the single-mode optical fibers with low loss and with favorable characteristics.

Figure 2:
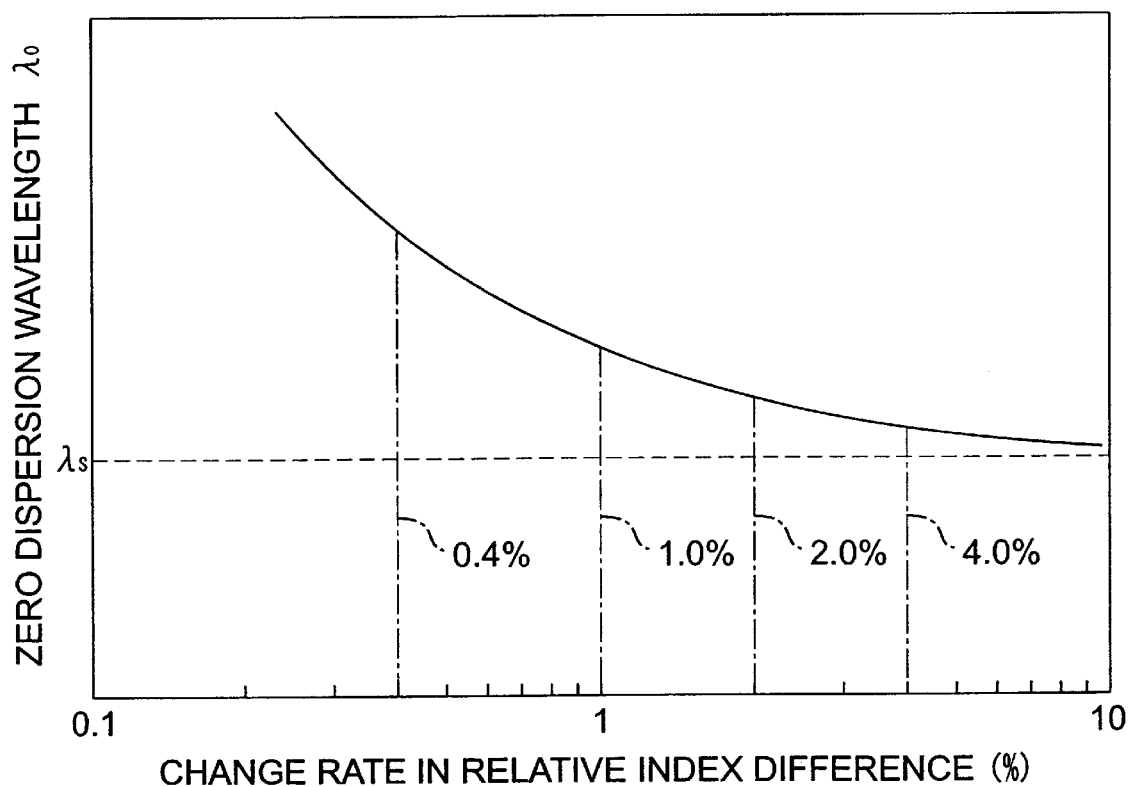
FIG. 2 is a graph to show change of zero dispersion wavelength against the change rate in relative index difference.

Here the zero dispersion wavelength, together with the transmission losses, varies with variation in the change rate in relative index difference. FIG. 2 is a graph to show the variation of the zero dispersion wavelength $\lambda_0$ against the change rate in relative index difference. In the graph the zero dispersion wavelength $\lambda_s$ indicated by a dashed line represents the zero dispersion wavelength in the case where a perfect step shape is assumed.

As illustrated in FIG. 2, the zero dispersion wavelength $\lambda_0$ of the single-mode optical fiber increases with decrease in values of the change rate in relative index difference. Therefore, the aforementioned lower limit 0.4% of the change rate in relative index difference is also effective in order to keep this zero dispersion wavelength in a favorable range. Further, the lower limit 1.0% of the change rate in relative index difference is also effective. In order to attain a steady zero dispersion wavelength, it is more preferable to set the range of the change rate in relative index difference to a range of values not less than 2.0% nor more than 4.0% on the upper limit side.

The fabrication method of fabricating the single-mode optical fiber in the above structure is preferably one having a forming step of forming the core region by the VAD method or the OVD method, and a selection step of selecting a transparent glass preform of the single-mode optical fiber including the core region. In this selection step, the evaluation by the change rate in relative index difference is carried out as described above for the transparent glass preform and the optical fiber is selected by applying the aforementioned preferable range of not less than 0.4% nor more than 4.0%, or the range of not less than 1.0% nor more than 4.0%, or the more preferable range of not less than 2.0% nor more than 4.0%. This ensures fabrication of the low loss single-mode optical fiber.

It is also possible to implement adjustment or the like of the fabrication conditions of the transparent glass preform, based on the results of the evaluation and selection. For example, in the case of the VAD method, the temperature on the side face of the core part is increased to raise the change rate in relative index difference by either of methods of increasing the flow rate of combustion gas, adjusting positional relation between burners, and so on, whereby the change rate in relative index difference of the optical fiber obtained can be adjusted.

The single-mode optical fibers with index change according to the conditions as described above are not limited to those consisting of the single core region and the cladding region as described above. FIG. 3 is a diagram schematically showing a cross-sectional structure of another embodiment of the single-mode optical fiber according to the present invention and an index profile thereof in the direction along the fiber diameter (or in the direction indicated by the line L in the figure). This optical fiber has an inner core portion 1a (inner core region 10a), an outer core portion 1b (outer core region 10b), and a cladding portion 3 (cladding region 30), and an interfacial portion 2 (interfacial region 20) is formed in the boundary between the inner core portion 1a (inner core region 10a) and the outer core portion 1b (outer core region 10b). In the figure Δn represents the relative index difference $\Delta n = (n_1 - n_2)/n_2$ of the inner core region 10a with respect to the refractive index of the outer core region 10b. Here, $n_1$ is the refractive index of the inner core region 10a and $n_2$ the refractive index of the outer core region 10b herein.

In the case of the single-mode optical fiber having the inner core region 10a and the outer core region 10b in this index profile structure, it is also feasible to provide the single-mode optical fiber with favorable characteristics, by setting the allowable range similarly to the range of not less than 0.4% nor more than 4.0%, or to the range of not less than 1.0% nor more than 4.0%, or to the more preferable range of not less than 2.0% nor more than 4.0% for the change rate in relative index difference $(0.5 \times \Delta n)/(d/r)$ defined from the relative index difference Δn defined as described above, the inner core radius r defined for the inner core in a manner similar to the core radius in FIG. 1, and the thickness d between the position of the relative index difference of 0.8×Δn and the position of the relative index difference of 0.3×Δn.

In addition, the above condition based on the change rate in relative index difference for the inner core region can also be applied similarly to single-mode optical fibers having the segment type core structure in which a ring core region of ring shape is formed outside a core region.

The present invention can be applied to the single-mode optical fibers provided with the interfacial region having the favorable index change so as to implement low loss phototransmission, and to the fabrication methods to fabricate such single-mode optical fibers. Particularly, the invention is advantageous in that when the optical fiber is selected by using the change rate in relative index difference obtained for the domain of relative index difference from 0.8×Δn to 0.3×Δn, as an index for the evaluation of refractive index change and setting the allowable range of values of the change rate to the range of not less than 0.4% nor more than 4.0%, the single-mode optical fiber with favorable characteristics and with low transmission loss can be realized while reducing the influence of the tail spread and the strain in the optical fiber.

What is claimed is:

1. A single-mode optical fiber having a step index profile, comprising a core region having a refractive index of $n_1$ and a cladding region disposed around the periphery of said core region and having a refractive index of $n_2$ to satisfy $n_2 < n_1$, wherein a relative index difference in each part is determined with respect to the refractive index $n_2$ of said cladding region, and a relative index difference of said core region is defined as Δn, wherein in an interfacial region with a continuously changing index profile near a boundary between said core region and said cladding region, for a portion in which a relative index difference varies from 0.8×Δn to 0.3×Δn, a change rate in relative index difference $(0.5 \times \Delta n)/(d/r)$ normalized by a core radius r, where d is a thickness of said portion in a direction along a fiber diameter, r is the core radius defined by a radius at a position where the relative index difference is 1/e of Δn, and 0.5×Δn is a relative index difference change, is not less than 0.4% nor more than 4.0%.

2. A single-mode optical fiber according to claim 1, wherein said change rate in relative index difference is not less than 1.0% nor more than 4.0%.

3. A single-mode optical fiber according to claim 1, wherein said change rate in relative index difference is not less than 2.0% nor more than 4.0%.

4. A single-mode optical fiber having a step index profile, comprising an inner core region having a refractive index of $n_1$, an outer core region disposed around the periphery of said inner core region and having a refractive index of $n_2$ to satisfy $n_2 < n_1$, and a cladding region disposed around the periphery of said outer core region, wherein a relative index difference in each part is determined with respect to the refractive index $n_2$ of said outer core region, and a relative index difference of said inner core region is defined as Δn, wherein in an interfacial region with a continuously changing index profile near a boundary between said inner core region and said outer core region, for a portion in which a relative index difference varies from 0.8×Δn to 0.3×Δn, a change rate in relative index difference (0.5×Δn)/(d/r) normalized by an inner core radius r, where d is a thickness of said portion in a direction along a fiber diameter, r is the core radius defined by a radius at a position where the relative index difference is 1/e of Δn, and 0.5×Δn is a relative index difference change, is not less than 0.4% nor more than 4.0%.

5. A single-mode optical fiber according to claim 4, wherein said change rate in relative index difference is not less than 1.0% nor more than 4.0%.

6. A single-mode optical fiber according to claim 4, wherein said change rate in relative index difference is not less than 2.0% nor more than 4.0%.

7. A method of fabricating a single-mode optical fiber having a step index profile comprising a core region having a refractive index of $n_1$ and a cladding region disposed around the periphery of said core region and having a refractive index of $n_2$ to satisfy $n_2 < n_1$, said method comprising:
a forming step of forming said core region by a VAD method or an OVD method; and
a selection step of selecting a transparent glass preform of the single-mode optical fiber including said core region,
wherein in said selection step,
a relative index difference in each part is determined with respect to the refractive index $n_2$ of said cladding region, and a relative index difference of said core region is defined as Δn, and
said transparent glass preform is selected so that in an interfacial region with a continuously changing index profile near a boundary between said core region and said cladding region, for a portion in which a relative index difference varies from 0.8×Δn to 0.3×Δn, a change rate in relative index difference (0.5×Δn)/(d/r) normalized by a core radius r, where d is a thickness of said portion in a direction along a fiber diameter, r is the core radius defined by a radius at a position where the relative index difference is 1/e of Δn, and 0.5×Δn is a relative index difference change, is not less than 0.4% nor more than 4.0%.

8. A method of fabricating a single-mode optical fiber according to claim 7, wherein said selection step comprises a step of selecting said transparent glass preform so that said change rate in relative index difference is not less than 1.0% nor more than 4.0%.

9. A method of fabricating a single-mode optical fiber according to claim 7, wherein said selection step comprises a step of selecting said transparent glass preform so that said change rate in relative index difference is not less than 2.0% nor more than 4.0%.

10. A method of fabricating a single-mode optical fiber having a step index profile comprising an inner core region having a refractive index of $n_1$, an outer core region disposed around the periphery of said inner core region and having a refractive index of $n_2$ to satisfy $n_2 < n_1$, and a cladding region disposed around the periphery of said outer core region, said method comprising:
a forming step of forming said inner core region by a VAD method or an OVD method; and
a selection step of selecting a transparent glass preform of the single-mode optical fiber including said inner core region,
wherein in said selection step,
a relative index difference in each part is determined with respect to the refractive index $n_2$ of said outer core region, and a relative index difference of said inner core region is defined as Δn, and
said transparent glass preform is selected so that in an interfacial region with a continuously changing index profile near a boundary between said inner core region and said outer core region, for a portion in which a relative index difference varies from 0.8×Δn to 0.3×Δn, a change rate in relative index difference (0.5×Δn)/(d/r) normalized by an inner core radius r, where d is a thickness of said portion in a direction along a fiber diameter, r is the core radius defined by a radius at a position where the relative index difference is 1/e of Δn, and 0.5×Δn is a relative index difference change, is not less than 0.4% nor more than 4.0%.

11. A method of fabricating a single-mode optical fiber according to claim 10, wherein said selection step comprises a step of selecting said transparent glass preform so that said change rate in relative index difference is not less than 1.0% nor more than 4.0%.

12. A method of fabricating a single-mode optical fiber according to claim 10, wherein said selection step comprises a step of selecting said transparent glass preform so that said change rate in relative index difference is not less than 2.0% nor more than 4.0%.

* * * * *